United States Patent [19]

Fiore et al.

[11] Patent Number: 5,017,657
[45] Date of Patent: May 21, 1991

[54] RAPIDLY-CRYSTALLIZING POLYESTER COMPOSITIONS

[75] Inventors: Leonardo Fiore, Milan; Italo Borghi, Ferrara; Andrea Mattiussi, Milan, all of Italy

[73] Assignee: Montedipe S.r.l., Milan, Italy

[21] Appl. No.: 402,526

[22] Filed: Sep. 5, 1989

[30] Foreign Application Priority Data

Sep. 9, 1988 [IT] Italy .................................. 21882 A/88

[51] Int. Cl.$^5$ .............................................. C08L 67/02
[52] U.S. Cl. ..................................... 525/173; 525/177

[58] Field of Search .................................. 525/177, 173

[56] References Cited

U.S. PATENT DOCUMENTS 3,673,139  6/1972  Hrach ................................. 525/177

*Primary Examiner*—Patricia Short
*Attorney, Agent, or Firm*—Morgan & Finnegan

[57] ABSTRACT

Rapidly-crystallizing polyester compositions comprising a polyester thermoplastic resin and a styrene polymer having an essentially syndiotactic structure.

16 Claims, No Drawings

RAPIDLY-CRYSTALLIZING POLYESTER COMPOSITIONS

DESCRIPTION OF THE INVENTION

The present invention relates to rapidly-crystallizing polyester compositions.

More particularly, the present invention relates to compositions based on linear polyesters which are particularly suitable for use in injection-molding.

Saturated, linear, thermoplastic polyesters, such as poly-(ethylene terephthalate), their copolymers and compounded blends are large-scale products which are manufactured at relatively low costs and which, in their crystalline state, show excellent physical and mechanical properties consistently with their high melting point.

Unfortunately, formulations based on the above polyesters are not readily applied in injection-molding. This is mainly due to the difficulties in obtaining, with traditional molds, suitably crystallized manufactured articles. Poly(ethylene terephthalate) (PET) containing no additives crystallizes very slowly from its molten phase, rendering the process economically disadvantageous. Additionally, crystallizing PET produces articles which have an uneven crystalline structure of spherulitic type, poor impact strength, and a rough surface. Its processing requires high molding temperatures and, in order to obtain dimensionally stable articles, long times inside the molds are required. In fact, the early removal from the mold of an insufficiently crystallized manufactured article may cause the article to further crystallize over time, which causes changes in volume, and possibly shape distortions.

Molding compositions of poly-(ethylene terephthalate) (PET) containing substances which increase the crystallization speed—generally known as "nucleating agents"—are known.

For that purpose, the following materials are used:
(1) Materials derived from:
  (a) hydrocarbon acids having a relatively high molecular weight, or organic polymers containing at least one carboxylic group; and
  (b) sources of sodium and/or potassium ions capable of reacting with the carboxy group in the acid or in the polymer as specified under (a); and
(2) Low-molecular-weight organic compounds comprising esters, ketones, sulfones, sulfoxides, nitriles and amides.

However, when more rapid crystallization or still lower molding temperatures are required, the addition of larger amounts of the above mentioned crystallization agent does not yield satisfactory outcomes, in that often their effect decreases as more is added or negative effects on the physical properties of the molded articles manufactures by starting from compositions containing said agents may be experienced.

Furthermore, the use of nucleating agents of ionic character (salts, esters) causes degradation of the polymer, with the consequent decay of its mechanical properties.

Therefore, the need is felt in the art for compositions which are capable of being injection-molded in order to yield high-quality finished articles at low molding temperatures, and which have a high rate of crystallization, without causing any detrimental effects to the physical properties of the articles.

The applicants have now found that the above reported effects are obtained by means of a new nucleating agent constituted by styrene polymers having a substantially syndiotactic structure.

Therefore, an object of the present invention is to provide rapidly-crystallizing PET compositions comprising, as the nucleating agent, effective amounts of styrene polymers having an essentially syndiotactic structure.

Styrene polymers having an essentially syndiotactic structure are known. Their preparation is disclosed in Italian patent applications Nos. 41,007 A/86 and 22,827 A/86 in the name of Montedison, the contents of which are herein incorporated as an integral part of the instant disclosure.

The essentially syndiotactic structure of these styrene polymers was characterized on the basis of the data obtained from X-ray diffractometry, from IR spectroscopic analysis, from $^1$H-N.M.R. and from $^{13}$C-N.M.R.

In particular, polystyrene having an essentially syndiotactic structure is characterized by an $^1$H-N.M.R. spectrum which shows chemical shifts of the methynic and methylenic protons respectively centered at 1.9 and 1.4 ppm. Furthermore, when observed by X-rays, the residue from extraction with methyl-ethyl-ketone, after melting and solidification, shows highest-intensity reflexes corresponding to interplanar distances of 13.1 Å; 7.6 Å; 6.46 Å; 4.37 Å; and 2.58 Å.

Polyparamethylstyrene having an essentially syndiotactic structure is characterized by a $^{13}$C-N.M.R. spectrum showing, in the region of the chemical shifts of the ring carbon atom linked to the —CH— group of the main chain, a single peak at 140.8 ppm, indicating high stereoregularity of the polymeric chain. Furthermore, the X-ray diffraction spectrum of a stretched fiber, made from a polyparamethylstyrene having an essentially syndiotactic structure, shows a repetition period of 5.1 Å along the chain axis, indicating a planar zig-zag structure of the polymeric chain, which is typical of a syndiotactic steric configuration.

The expression "essentially syndiotactic structure," as used in the instant disclosure and in the appended claims, means that such a structure exists at least along long portions of the polymeric chains.

The molecular weight of the styrene polymers having an essentially syndiotactic structure used in the compositions according to the present invention can have a weight average molecular weight Mw in the range of from 25,000 to 1,200,000, preferably in the range of from 100,000 to 800,000.

Syndiotactic styrene polymers having a melting temperature of at least 250° C., and in particular within the range of from 260° C. to 275° C. are preferred.

The definition of "styrene polymers" is herein meant to encompass not only the homopolymers of styrene and in general, the homopolymers of vinyl-aromatic monomers of formula:

$$CH_2=CH-R,$$

wherein R is an aryl radical, an alkyl-aryl radical, or a halogen-substituted aryl radical, containing from 6 to 20 carbon atoms, but also their copolymers with up to 30% by weight of another ethylenically unsaturated, copolymerizable monomer, provided that they have an essentially syndiotactic structure.

Among the preferred styrene polymers, besides polystyrene, are syndiotactic polyparamethylstyrene and the copolymers of styrene with polyparamethylstyrene, having a syndiotactic structure.

In order to produce the composition according to the present invention, any thermoplastic polyester resin can be used, and can be obtained by means of the well-known processes of polycondensation of an aromatic diacid, or of mixtures of aromatic diacids, such as terephthalic acid, or of a cycloaliphatic acid, such as cyclohexane-dicarboxy acid, and their alkyl-esters, with aliphatic, aromatic or cycloaliphatic glycols, such as ethylene glycol, butylene glycol, and so forth.

The term "thermoplastic polyester resin" is understood to also encompass the polycondensation products containing, besides the aromatic acid and a glycol, from 0.01 to 10% by weight of an aliphatic acid containing from 1 to 16 carbon atoms and/or a poly-oxyalkylene-glycol containing from 1 to 6 carbon atoms in its oxyalkylenic chain.

In general, the polyester resin has a molecular weight higher than 5,000.

PET and its copolymers containing small amounts of poly-oxyethylene-glycol are preferred.

The nucleating agent can be added to the polyester resin either:
1. directly, in amounts generally not larger than 30% by weight, and preferably from 0.01 to 10% by weight, relative to the polyester; or
2. after said nucleating agent has been mixed, at high concentrations, with a polyester resin, a masterbatch being obtained, which is capable of performing the nucleation action.

Said masterbatch can be obtained by means of the normal compounding techniques, by adding the nucleating agent at concentrations within the range of from 0.5 to about 50% by weight, and preferably within the range of from 2 to 30% by weight, relative to the polyester resin.

The molecular weight and the physical-chemical properties, such as viscosity, of the masterbatch containing the nucleating agent used in order to prepare the composition according to the present invention may vary within wide limits, as a function of the operating conditions, and the type of polyester and styrene polymer used.

However, in general, the masterbatch containing the nucleating agent according to the present invention has an intrinsic viscosity (as measured in 60:40 phenol/tetrachloroethane at a concentration of 0.25 g/dl and at 30° C.) higher than 0.1 dl/g, and a number average molecular weight (Mn) higher than 1000.

In the case where the nucleating agent is directly added (above case 1.), the nucleating agent is compounded with the thermoplastic polyester resin in the molten state in an amount preferably within the range of from 0.01 to about 10% by weight, relative to the polyester resin.

In the case where the nucleating agent is added by means of a masterbatch (above case 2.), said masterbatch is added to the resin in an amount within the range of from 1 to about 50% by weight, and preferably within the range of from 2 to about 20% by weight, relative to the polyester resin.

The rapid-crystallizing polyester compositions according to the present invention are characterized by high crystallization temperatures, rapid crystallization, homogeneous distribution, and low nucleating agent concentrations.

In particular, rapid crystallization can be obtained by directly adding very low concentrations of the nucleating agent (above case 1.). Furthermore, rapid nucleation can be achieved without considerable changes in the viscosity of the polyester composition when nucleating agent is added via a masterbatch.

The nucleating agents can be added to the polyester resin in order to obtain the compositions according to the present invention by any conventional methods for adding additives to molten polyester masses, e.g., by means of the compounding techniques inside mixers, extruders, and so forth.

To the compositions, inert fillers, such as fiberglass, carbon fibers, boron fibers, and so forth, and/or inorganic particles of glass, mica, zeolites, graphite, talc, etc., as well as organic fibers such as aramidic fibers, polyacrylonitrile fibers, and so on, can be added.

Furthermore, conventional additives and/or auxiliary substances can be added to the compositions according to the present invention, if necessary, in order to improve their thermal stability, oxidative stability and light stability. Additional additives, such as pigments, dyes, flame-retardants, mold-release agents and various inert fillers can also be added. Small amounts of other types of thermoplastic resins or small amounts of rubbery compositions can be added to said compositions in order to improve their impact-strength properties.

The compositions according to the present invention can be used to produce a large number of finished articles by injection-molding or extrusion techniques. In particular, car parts, electrical parts, and the like, can be produced. Said compositions can be further used as fibers, films, sheets, and so on.

The polyester compositions according to the present invention are crystallized from the molten state in shorter times and at higher temperatures than are the corresponding polyester resins without the additives.

This behavior can be observed by means of analysis by the differential scanning calorimeter (DSC), from which one can see that the incipient crystallization temperature, the temperature of most rapid crystallization and the end crystallization temperature are all higher, and are within a narrower range, than the corresponding temperature values of the polyester resin not containing the additives according to the present invention.

A further advantage of the polyester compositions according to the present invention is that for some of them, such as those containing PET copolymers, cold crystallization does not occur even when the molten composition is rapidly cooled at rates greater than 400° C./minute. This behavior means that the crystallization process from the molten mass in the compositions according to the present invention also takes place when the product undergoes a very quick cooling (i.e., a quenching). This is an undoubted technologic advantage in the processes of injection-molding, in that dimensionally stable finished articles can be obtained.

EXAMPLES

In order to better understand and practice the present invention, the following are some illustrative, non-limitative examples.

The evaluation of the efficiency of the nucleating agent is carried out on the basis of the peak temperature of the crystallization of compounds consisting of polyester resin and nucleating agent during their cooling from their molten mass, as determined by means of differential thermal analysis.

The intrinsic viscosity ($\eta$) is measured in a 60:40 mixture of phenol:tetrachloroethane 30° C. at a concentration of 0.25 g/dl.

The number average molecular weight (Mn) and the weight average molecular weight (Mw) were computed by gel permeation chromatography (GPC), using m-cresol as the solvent, at 100° C.

The temperatures of crystallization from the molten mass, of incipient crystallization ($T_1$) and of end crystallization ($T_2$) were measured by means of the Perkin Elmer DSC 7 differential calorimeter, by reading the temperature at the peak, at the beginning and at the end of the crystallization exotherm.

EXAMPLES 1-3

In a mixer, PET having an intrinsic viscosity of 0.78 dl/g (which was previously dried for 12 hours at 120° C., under vacuum) and syndiotactic polystyrene having a residue from extraction in MEK (methyl-ethyl-ketone) carried out in a Kuma Gava extractor for 24 hours, of 93%; a weight average molecular weight [as determined by means of the analysis by gel permeation chromatography (GPC), carried out by means of a Waters 150 ALC-GPC equipment in ortho-dichloro-benzene at 135° C.] of 660,000; a melting point (determined by means of the PerkinsElmer DSC 7 differential calorimeter, as the temperature corresponding to the maximum of the endothermic peak, at a scanning speed of 40° C./minute) of 275° C., are compounded as shown in Table 1.

When observed by X-rays, the residue from extraction with methyl-ethyl-ketone (MEK) of polystyrene shows, after melting and solidification, highest-intensity reflexes corresponding to interplanar distances of 13.1 Å; 7.6 Å; 6.46 Å; 4.37 Å; and 2.58 Å.

The $^1$H-N.M.R. spectrum of polystyrene, as carried out by means of the BRUKER AM-300 instrument in orthodichlorobenzene at 125° C. with hexamethyl-disiloxane as the reference standard, show chemical shifts of the methynic and methylenic protons respectively centered at 1.9 and 1.4 ppm.

Said polystyrene was prepared according to the process disclosed in Italian patent application No. 41,007 A/86 in the name of Montedison S.p.A.

The so produced compound was extruded at 280° C.

The physical-chemical characteristics of the produced composition are reported in Table 1.

TABLE 1

| | Example No. | | |
|---|---|---|---|
| | 1 | 2 | 3 |
| COMPOSITION: | | | |
| Poly(ethylene terephthalate), % by weight | 100 | 97 | 95 |
| Polystyrene, % by weight | — | 3 | 5 |
| CHARACTERISTICS: CRYSTALLIZATION FROM MOLTEN MASS | | | |
| Incipient crystallization temperature, °C. | 213 | 228 | 241 |
| End crystallization temperature, °C. | 142 | 172 | 170 |
| Crystallization peak temperature, °C. | 170 | 198 | 198 |
| Energy variation ($\Delta$H), J/g | −38 | −41 | −44 |

EXAMPLES 4-6

Following the procedure of Example 1, compounds of a copolymer of poly-(ethylene terephthalate) (having an intrinsic viscosity of 0.81 dl/g and prepared by means of polytransesterification of 120 mol of dimethyl terephthalate, 219 mol of ethylene glycol and 1 mol of poly-oxyethylene-glycol having a molecular weight of 1,500) and syndiotactic polystyrene having the characteristics of Example 1 were prepared.

The compositions and the characteristics of the compounds are reported in the following Table 2:

TABLE 2

| | Example No. | | |
|---|---|---|---|
| | 3 | 4 | 5 |
| COMPOSITION: | | | |
| Copolyester, % by weight | 100 | 97 | 95 |
| Polystyrene, % by weight | — | 3 | 5 |
| CHARACTERISTICS: CRYSTALLIZATION FROM MOLTEN MASS | | | |
| Incipient crystallization temperature, °C. | 214 | 245 | 247 |
| End crystallization temperature, °C. | 115 | 151 | 147 |
| Crystallization peak temperature, °C. | 195 | 210 | 214 |
| Energy variation ($\Delta$H), J/g | −37 | −41 | −50 |
| COLD CRYSTALLIZATION AFTER QUENCHING AT 480° C./MINUTE | | | |
| Incipient crystallization temperature, °C. | 83 | none | none |
| End crystallization temperature, °C. | 144 | " | " |
| Crystallization peak temperature, °C. | 124 | " | " |
| Energy variation ($\Delta$H), J/g | −22 | " | " |
| MELTING AFTER QUENCHING AT 480° C./MINUTE | | | |
| Incipient melting temperature, °C. | 201 | 187 | 182 |
| End melting temperature, °C. | 257 | 282 | 279 |
| Melting peak temperature, °C. | 250 | 254 | 258 |
| Energy variation ($\Delta$H), J/g | 40 | 40 | 41 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above mentioned references are hereby incorporated by reference.

What is claimed is:

1. Rapidly-crystallizing polyester compositions comprising a thermoplastic polyester resin and an effective amount of nucleating agent, characterized in that said nucleating agent is a styrene polymer having an essentially syndiotactic structure.

2. Compositions according to claim 1, wherein the styrene polymer having an essentially syndiotactic structure has a weight average molecular weight in the range of from 25,000 to 1,200,000.

3. Compositions according to claim 2, wherein the weight average molecular weight of the styrene polymer is in the range of from 100,000 to 800,000.

4. Compositions according to claim 1, 2, or 3, wherein the styrene polymer has a melting temperature of at least 250° C.

5. Compositions according to claim 4, wherein the melting temperature of the styrene polymer is in the range of from 260° C. to 275° C.

6. Compositions according to claim 1, wherein the styrene polymer having an essentially syndiotactic structure is selected from the group consisting of a styrene homopolymer, a homopolymer of a vinyl-aromatic monomer of formula:

$$CH_2=CH-R$$

wherein R is an alkyl-aryl radical or a halogen-substituted aryl radical, and a copolymer thereof with up to 30% by weight of a further ethylenically-unsaturated, copolymerizable monomer.

7. Compositions according to claim 1, wherein the styrene polymer having an essentially syndiotactic structure is polystyrene whose $^1$H-N.M.R. spectrum shows chemical shifts of the methynic and methylenic protons respectively centered at 1.9 and 1.4 ppm, and whose residue from extraction with methyl-ethyl-ketone shows, by X-rays, after melting and solidification, highest-intensity reflexes corresponding to interplanar distances of 13.1 Å; 7.6 Å; 6.46 Å; 4.37 Å; and 2.58 Å.

8. Compositions according to claim 1, wherein the styrene polymer having an essentially syndiotactic structure is poly-paramethylstyrene whose X-ray diffraction spectrum of a stretched fiber shows a repetition period of 5.1 Å along the chain axis, and whose $^{13}$C-N.M.R. spectrum shows a single peak at 140.8 ppm in the region of the chemical shifts of the ring carbon atom linked to the —CH— group of the main chain.

9. Compositions according to claim 1, wherein the styrene polymer having an essentially syndiotactic structure is added to the thermoplastic polyester resin in amounts not more than 30% by weight.

10. Compositions according to claim 9, wherein 0.01% to 10% by weight of styrene polymer is added.

11. Compositions according to claim 1, wherein the nucleating agent is added as a separately prepared masterbatch.

12. Compositions according to claim 11, wherein said masterbatch is prepared by compounding the polyester resin with the styrene polymer having an essentially syndiotactic structure in amounts within the range of from 0.5% to 30%.

13. Compositions according to claim 12, wherein the range is from 2% to 30% by weight.

14. Compositions according to claims 11, wherein said masterbatch is added to the polyester resin in amounts in the range of from 1 to 50%.

15. Compositions according to claim 14, wherein from 2 to 20% of the masterbatch is added.

16. Compositions according to claim 1, wherein the polyester resin is poly-(ethylene terephthalate) or a copolymer thereof containing units deriving from polyoxyethylene-glycol.

* * * * *